UNITED STATES PATENT OFFICE.

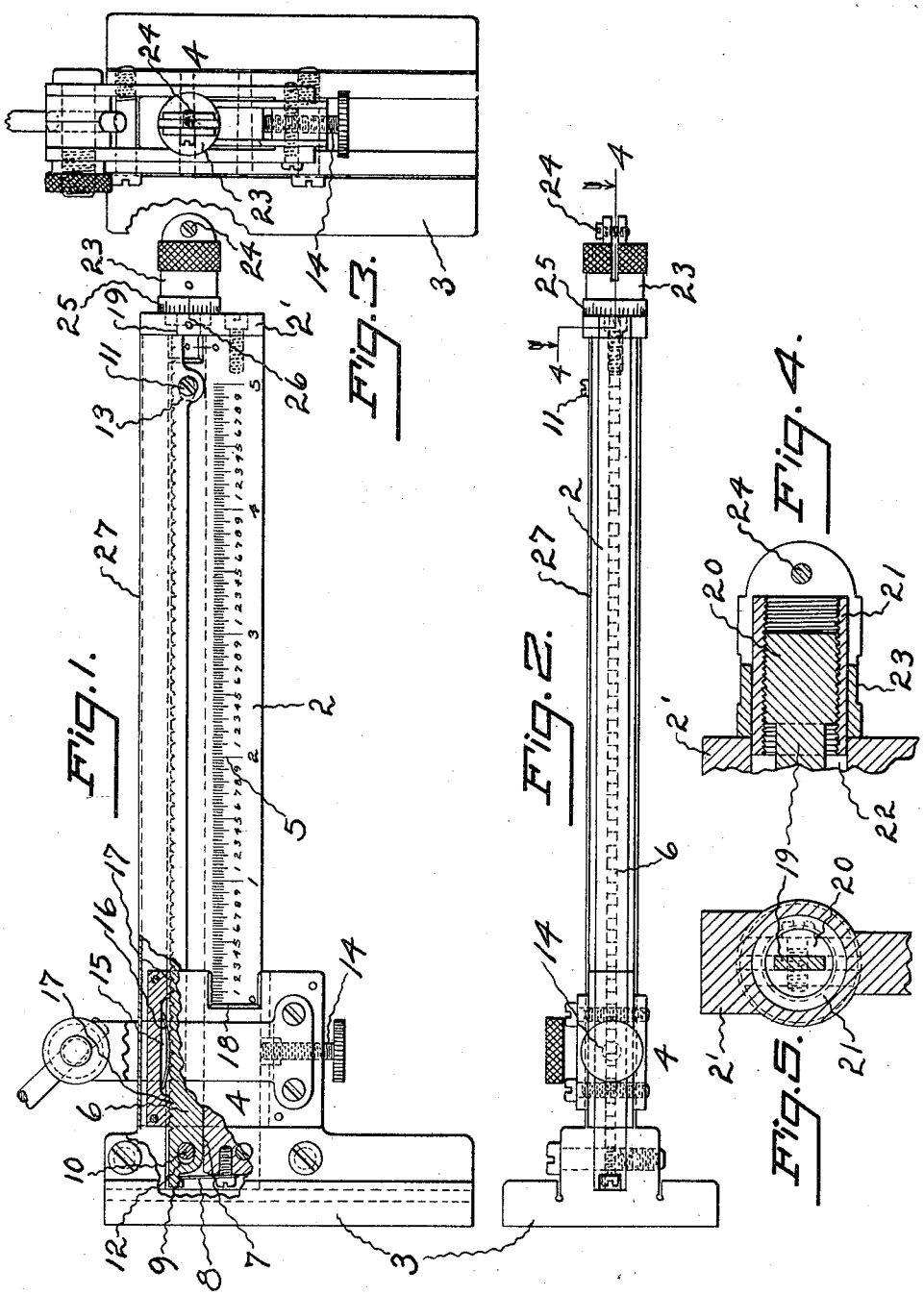

FRANK S. BUCKMINSTER, OF HARTFORD, CONNECTICUT.

MEASURING INSTRUMENT.

1,323,740.  Specification of Letters Patent.  Patented Dec. 2, 1919.

Application filed February 24, 1919. Serial No. 278,560.

*To all whom it may concern:*

Be it known that I, FRANK S. BUCKMINSTER, a citizen of the United States, residing at Hartford, in the county of Hartford and State of Connecticut, have invented certain new and useful Improvements in Measuring Instruments, of which the following is a specification.

This invention relates to measuring instruments, the object of the invention being the provision of means by which I can rapidly and easily obtain accurate adjustments. In Patent No. 909,538, issued to me, January 12, 1909, and to which reference may be had, is shown a measuring instrument of the same general type as that covered in the present case. The instrument of said Letters Patent possesses certain advantages, all of which are present in the one covered hereby. In the improved measuring instrument, however, I insure certain advantages not attainable by that of the patent, as I will more fully set forth in the following description, wherein I will outline in detail that form of embodiment of the invention which I have selected for illustration in the drawings accompanying and forming part of the present specification, this showing being primarily provided to enable those skilled in the art to practise the invention. It will be of course clear that I am not restricted to such disclosure. I may depart therefrom in several ways within the scope of the invention defined by the claims following said description.

Referring to said drawings:—

Figure 1 is a side elevation with a portion broken away, of a measuring instrument involving the invention.

Fig. 2 is a back elevation of said instrument.

Fig. 3 is a top plan view of the same.

Fig. 4 is a section on the line 4—4 of Fig. 2 looking in the direction of the arrows.

Fig. 5 is a cross section.

Like characters refer to like parts throughout the several views which are on slightly different scales.

In my prior patent, which I have identified, I have provided in connection with a movable member such as a jaw, by which a rough or an initial adjustment of such a movable member can be accomplished, subsequent to which a final or micrometer adjustment thereof can be secured. As may be inferred, one of the primary aims I have in view is the provision of effective means by which these two adjustments of such a movable member or equivalent element, can be obtained.

As will be clear, the device comprises in its structure a body and this body may stand horizontally or vertically or at an angle thereto, this being an unimportant matter. A body such as meets my condition is that denoted in a general way by 2 and it is virtually in the form of a beam or bar. This body 2 is made rigid in some suitable way with a base or foot as 3. The body 2, as will be understood, presents a convenient support for a gaging member such as that denoted in a general way by 4, the gaging member being slidable upon the body 2 practically longitudinally thereof. This gaging member may function in any desirable way; as an illustration, it might be the equivalent of the movable or adjustable jaw of my patent. The body 2 has on one of its side faces a scale as 5 practically after the fashion illustrated in said Letters Patent, the graduations of this scale showing what might be considered as the rough or initial adjustment. The gaging member or block 4 slides on the body 2 longitudinally thereof.

This body 2 or its equivalent constitutes a suitable support for a rack-bar, as 6, which constitutes an effective means for maintaining the gage member 4 in position to secure what I have referred to as the micrometer adjustment, the gaging member in fact being locked to such rack bar after its final adjustment. The body 2 has in its upper or outer side a longitudinal groove or channel 7 in which the rack-bar is fitted. The rack-bar is normally maintained in its retracted or backward position in some suitable way, as by the spring 8 fastened for example to the rear end of the body 2 and the free portion of which fits a notch as 9 in the back end of the rack bar. Means are provided for limiting the endwise or longitudinal movement of the rack-bar 6 and for such purpose screws as 10 and 11 are shown, the screws being covered by the body 2 and extending through longitudinal slots as 12 and 13 adjacent the terminals of the rack-bar 6. The slots 12 and 13 are comparatively short as the rack-bar does not have an unusual amount of movement; normally the screws 10 and 11 are midway of the respective slots.

It will be understood that the gaging member 4 surrounds and slides on the scaled or graduated body 2. It will also probably be understood that the rack-bar 6 extends through said gaging member.

Tapped through the under portion of the gaging member 4 is a screw 14. The upper portion of the gaging member has a cavity 15 in which is received the bowed spring 16 bearing at its ends against the upper wall of the cavity and between its ends against the rack bar 6. The said gaging member 4 has between it at opposite sides of the cavity 16, teeth as 17, adapted to coöperate with those of the rack-bar. The screw 14 is assumed to be run all the way in so as to cause the teeth 17 to engage those of the rack-bar 6 to thus hold the gaging member 4 in a fixed position. To free the gaging member, the screw 14 will be backed out so that the spring 16 will cause the teeth 17 to be freed from those of the rack-bar and thus permit the adjustment of the gaging member 4 along the graduated body 2. When the gaging member is in a desired position, as will be determined by the coincidence of the rear wall of the opening 18 with a graduation of the scale 5, the screw 14 will be run in, thus coupling the gaging member 4, with the rack-bar 6. This in fact is the procedure which follows the rough or initial adjustment of the gaging member 4.

The final adjustment of the gaging member 4 is secured through the endwise or longitudinal movement of the rack-bar. The means for effecting such adjustment of the rack-bar, while the gaging member 4 is coupled thereto may as will be understood vary, although those shown for the purpose and now to be described, meet my conditions in a satisfactory manner. The rack-bar 6 has at its forward end the neck 19 terminating in a hub 20 practically of cylindrical form and shown as having external threads of rather fine pitch to receive threads on the sleeve or barrel 21 which surrounds the same and which extends as shown somewhat beyond the ends of the hub or head 20. The inner end of this sleeve 21 fits and turns in the chamber 22 in the bar 2' at the forward end of the graduated body 2. The sleeve or barrel 21 is shown as surrounded by the tubular clamping or manipulating member 23, held in clamping engagement with the sleeve or barrel by the pin or screw 24, the inner edge of said manipulating or clamping member having a substantial bearing against the front end of the body 2. This clamping or manipulating member has at its inner portion the circumferential scale 25 coöperative with a zero mark 26 on the adjacent end of the body 2. Normally, the zero mark of the scale 25 is opposite the zero mark 26, as shown for instance, in Fig. 1.

It will be assumed that it is desired to adjust the gaging member or block 4. In this event, the following action will take place: The screw 14 will first be backed out thus freeing the gaging member so that it can be moved longitudinally along the body 2 and likewise with respect to the rack-bar 6, then held in its retracted position by the spring 8. When said gage member has been adjusted to the desired and approximate position, which is indicated by the scale 5, the final adjustment is brought about, the screw 14 being manipulated so that the gage member will be brought into coupled relation with the rack-bar. After this is done the adjusting or manipulating thimble 23 is turned, thus turning the sleeve or barrel 21, and as a consequence, moving the rack-bar either forwardly or backwardly depending of course upon the direction which the thimble 23 is turned. When this is done the gaging member 4 is locked substantially to the rack-bar 6 by running in the screw 14 which brings the teeth 17 into firm mesh with those of the rack-bar.

It is desirable to protect the rack-bar 6 as well as certain other parts from exposure, and for this purpose I show a barrier or guard member 27, which consists of a channeled strip embracing the body 2 practically for its complete length and also overlying the gage member 4. This guard member or barrier 27 is held in place by the screws 10 and 11, which, it will be remembered are utilized to limit the position of the rack-bar 6.

As shown the body 2 and the rack bar 6 have zero marks at the right or outer ends thereof as illustrated in Fig. 1. When these marks register as shown, this indicates positively that the rack bar is in its normal position.

What I claim is:

1. A measuring instrument comprising a body, a gage member associated with said body for adjustment there-along, a bar supported by the body, a spring fastened to the rear end of the body, the bar having a notch at its back end to receive the free portion of the spring, the latter tending constantly to retract said bar, fixed pins on the body, the bar having longitudinal slots to receive said pins, means for advancing the pins longitudinally of the body, and means for coupling the gaging member to the bar.

2. A measuring instrument comprising a body, a gaging member associated with said body for adjustment therealong, a rack-bar supported by the body and having a threaded forward end, means for coupling the gaging member with the rack-bar, a sleeve in threaded engagement with said threaded end, and a divided manipulating portion in clamping engagement with the sleeve and abutting against a fixed part of the body.

In testimony whereof I affix my signature in the presence of two witnesses.

FRANK S. BUCKMINSTER.

Witnesses:
GERTRUDE C. NITKIN,
HEATH SUTHERLAND.